US 6,550,340 B1

(12) United States Patent
Barefoot

(10) Patent No.: US 6,550,340 B1
(45) Date of Patent: Apr. 22, 2003

(54) ATTACHMENT FOR SAMPLING PURGE GAS

(75) Inventor: Byron G. Barefoot, Nokesville, VA (US)

(73) Assignee: Byron Barefoot, Nokesville, VA (US)

( * ) Notice: Subject to any disclaimer, the term of this patent is extended or adjusted under 35 U.S.C. 154(b) by 0 days.

(21) Appl. No.: 10/086,854

(22) Filed: Mar. 4, 2002

(51) Int. Cl.⁷ .................................................. G01L 7/00
(52) U.S. Cl. ........................................................ 73/756
(58) Field of Search ...................... 73/730, 756, 861.42, 73/49.5, 49.1, 37

(56) References Cited

U.S. PATENT DOCUMENTS 4,817,437 A * 4/1989 Dennis et al. ................ 73/756
5,535,629 A * 7/1996 Gerdes et al. ................ 73/756
6,073,481 A    6/2000 Barefoot
6,401,546 B1 * 6/2002 Kocian et al. ................ 73/756

* cited by examiner

Primary Examiner—Hezron Williams
Assistant Examiner—Jermaine Jenkins
(74) Attorney, Agent, or Firm—McGuireWoods LLP

(57) ABSTRACT

A pressure measuring device measures the pressure of a gas flowing in two pipes to be welded together at a joint. The device includes a collar having a groove formed therein and a pressure sensing device in fluid communication with the groove. The groove is formed to surround and seal a portion of the perimeter of the joint to be welded, while the collar is formed to surround and seal an additional portion thereof. Thus, the groove and the outer surface of the pipes to be welded defined a sealed cavity into which the flowing gas may leak. The pressure within this cavity is thus an indicator of the pressure of the flowing gas inside the pipe.

20 Claims, 9 Drawing Sheets

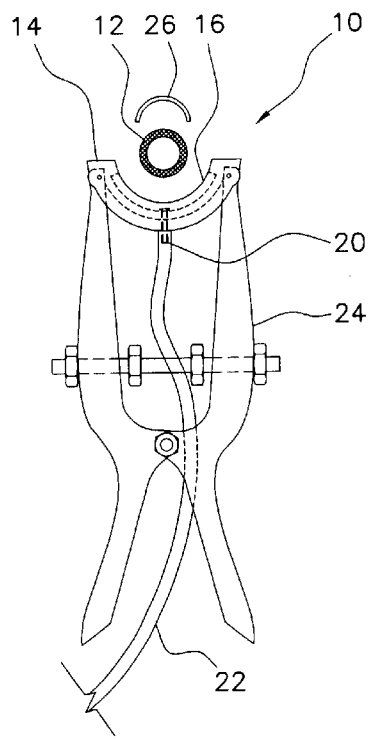
FIG. 1a
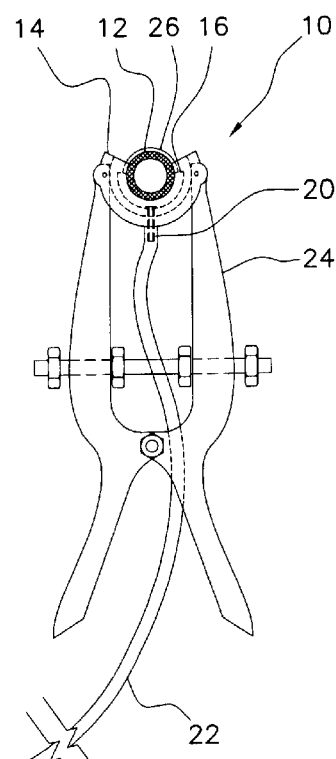
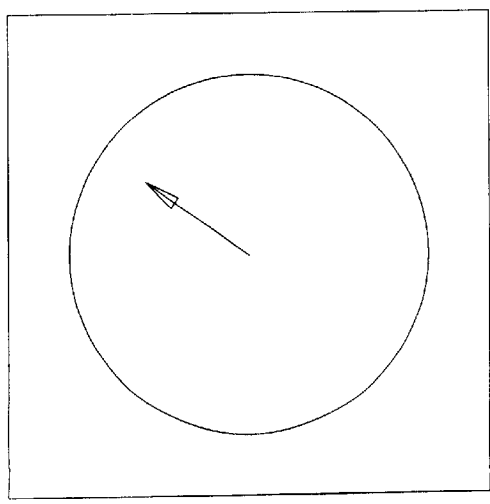
FIG. 1b

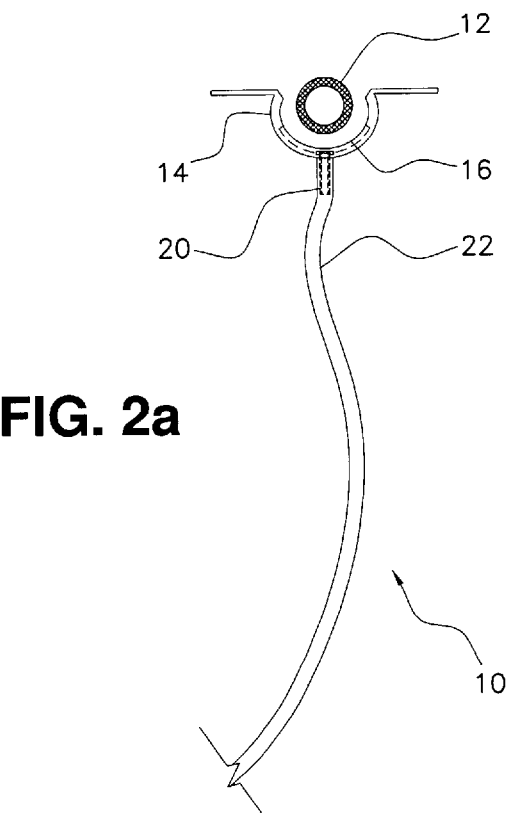
FIG. 2a
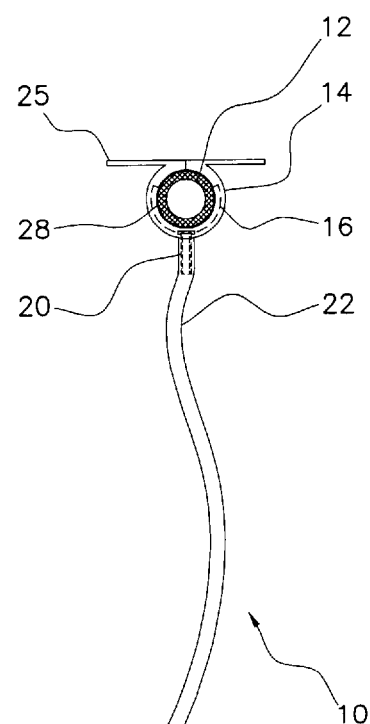
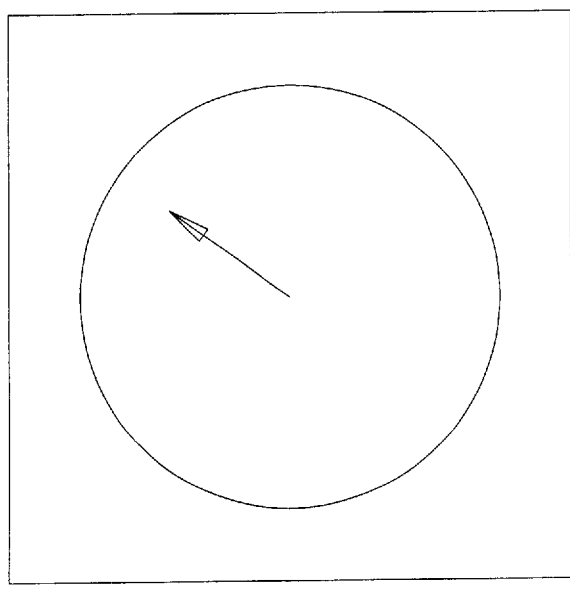
FIG. 2b

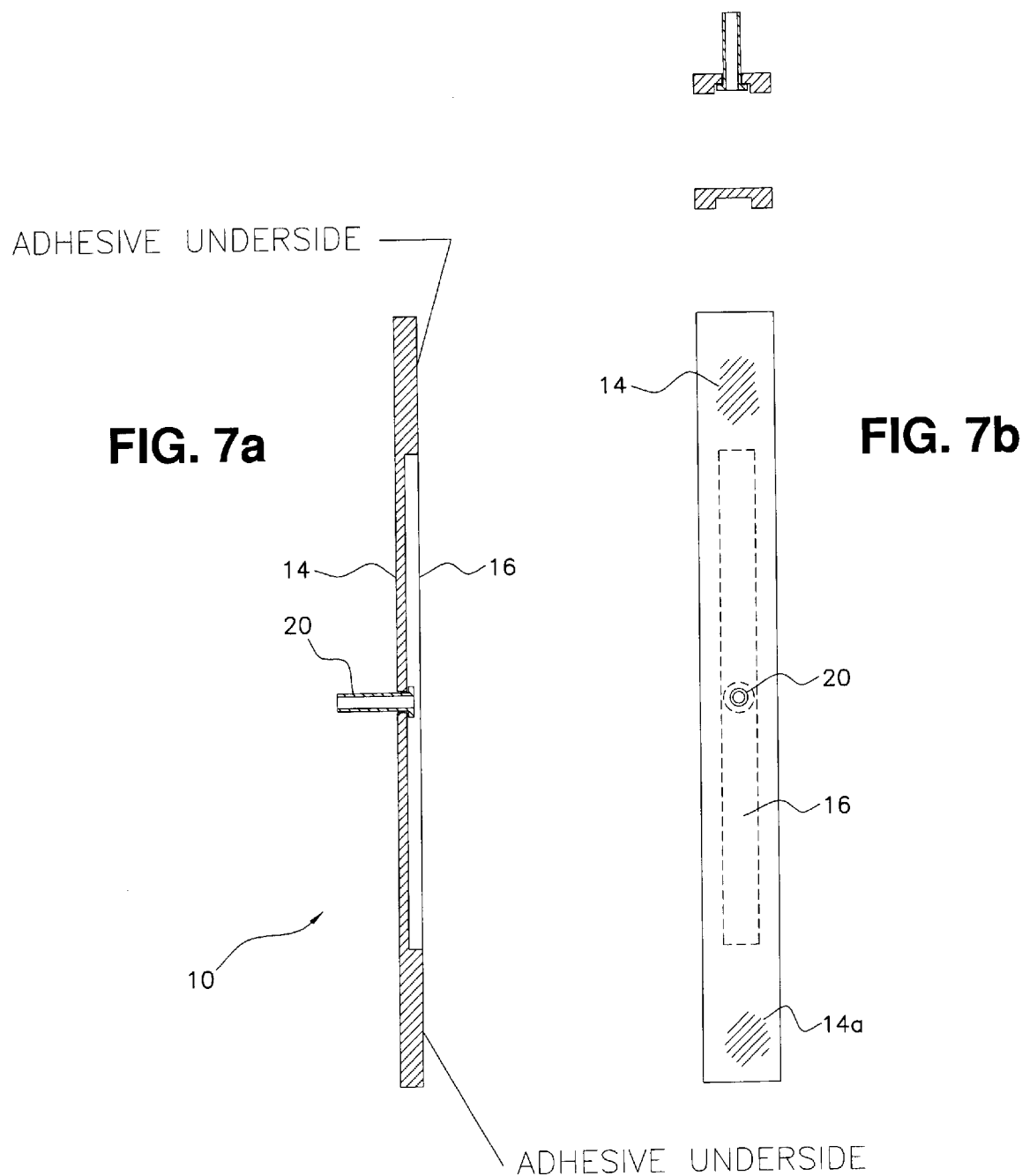

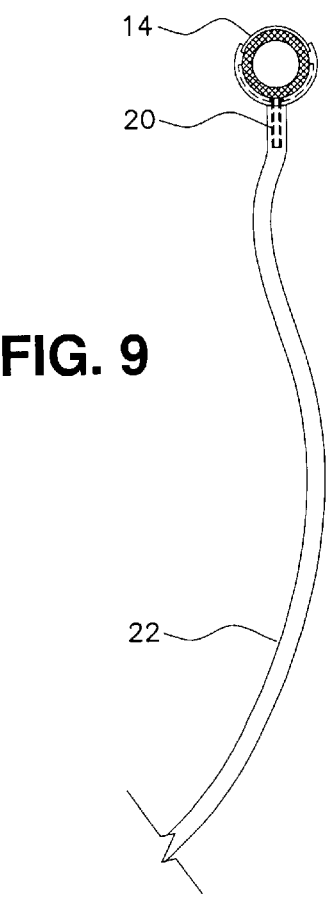
FIG. 9
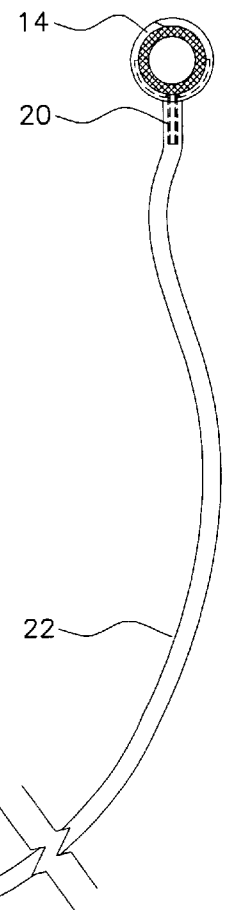
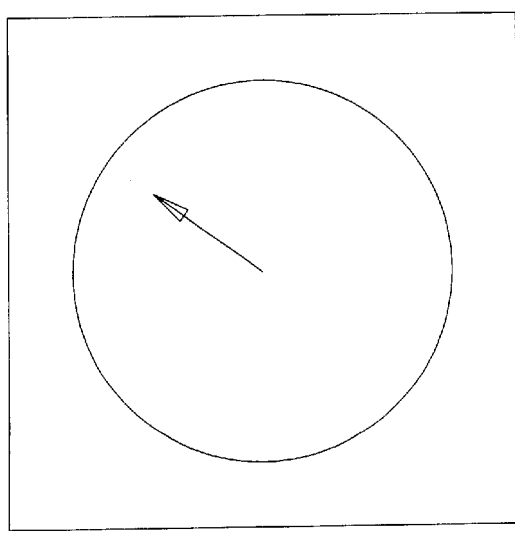
FIG. 8

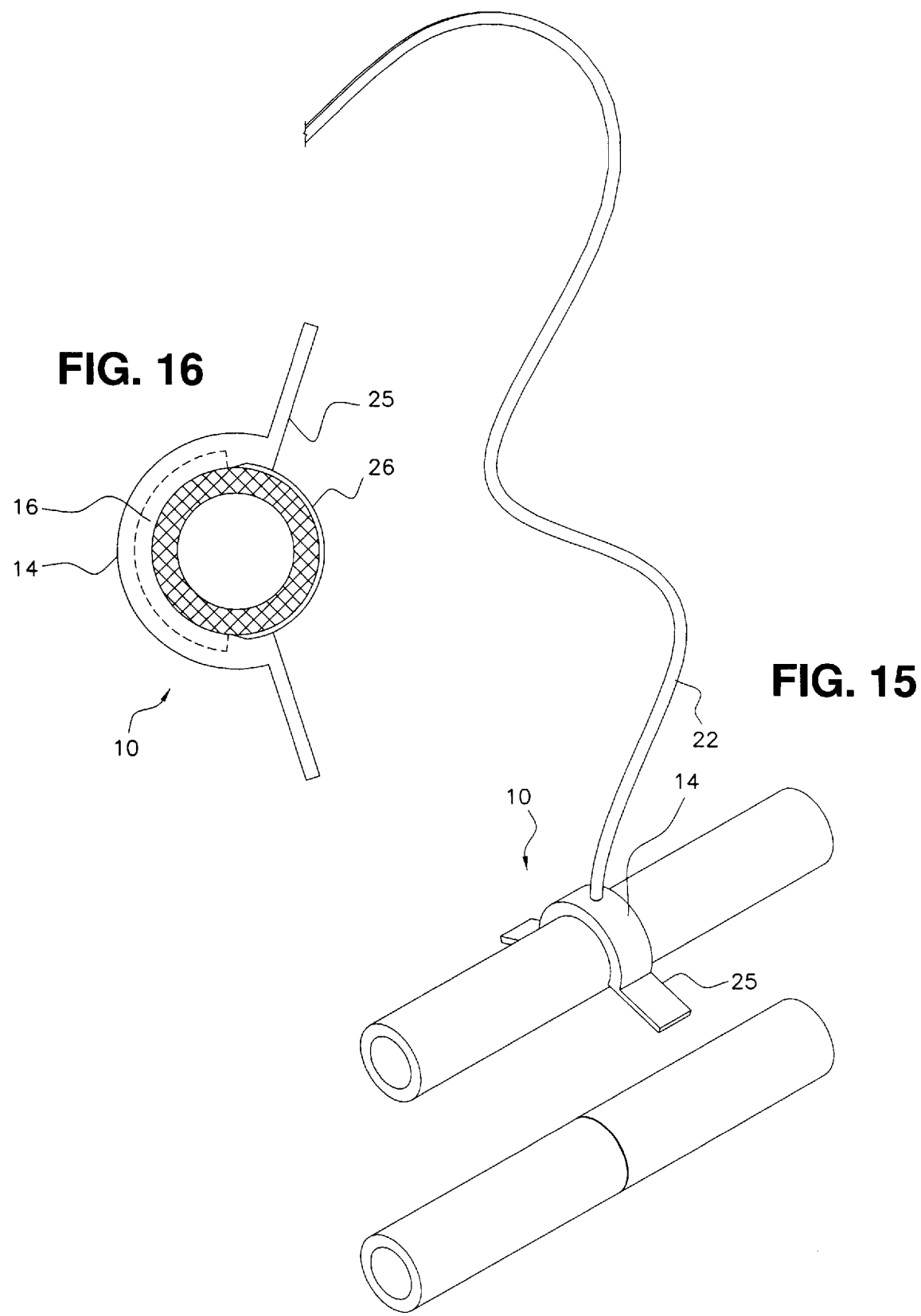

ATTACHMENT FOR SAMPLING PURGE GAS

DESCRIPTION

BACKGROUND OF THE INVENTION

1. Field of the Invention

The present invention relates generally to an attachment for sampling an inert purge gas pressure at a weld site. More particularly, the invention relates to an attachment for use with an orbital welding apparatus for measuring the pressure of an inert purge gas flowing in a pipeline to be welded.

2. Background Description

Orbital welding machines have become quite popular for welding pipelines, and especially for the welding of stainless steel pipelines as are commonly run in large plants, for example, semiconductor manufacturing plants. Stainless steel pipelines are used to carry a great variety of gaseous and liquid materials through a plant, and the construction of such pipelines requires the welding of a large number of fittings and long lengths of high purity stainless steel pipe. The quality of weld required in such applications mandates a reproducible weld of uniformly high quality, and orbital welding machines have been developed for just such applications.

Orbital welding machines rely upon an essentially constant flow of an inert purge gas flowing through the pipeline at a low, but constant, pressure. However, in order to maintain a constant pressure of the gas, a very precise measuring technique is required. Typically, a low pressure gauge known as a Magnehelic gauge is used, providing a visual indication of pressures ranging from about zero to about ten inches of water. Most often, such gauges are connected to the pipeline being welded by means of a simple T-fitting temporarily inserted into the pipeline, with the stem of the fitting being connected directly to the gauge via a piece of tubing or hose. At one end the pipeline is connected to a source of inert gas, such as a gas cylinder, while the other end of the pipeline has a restrictor to reduce the size of the open end and provide a constant back pressure to the flowing inert gas.

Experience has shown that, while a good reading of the pressure may be obtained using a T-fitting, and a constant pressure can be maintained by closely watching the Magnehelic gauge, variations in the pressure in the pipeline nonetheless occur, causing problems with the quality of the weld. Moreover, the length of pipeline between the source of the gas and the restrictor varies from one weld to the next, and constant monitoring of the pressure is needed. Furthermore, as a weld progresses around the circumference of the pipeline or fitting, the gap between the two ends being welded is gradually closed, and the escape of gas through the butted ends of pipe gradually diminishes until the weld is completed. Since there is inherently some loss at the butted ends, there is a gradual increase in the gas pressure in the pipeline until the weld is completed. Under some conditions, if the pressure is not properly controlled as the weld progresses, the pressure can rise sufficiently to blow through the weld. The greater the distance between the weld site and the T-fitting, the more likely the weld is to blow through or the correct weld profile will not be maintained because of pressure difference at the weld site and the "T" location.

For example, the use of T-fittings also requires the installation and removal of the T-fitting at each weld site prior to each weld. However, a number of problems are also introduced by using such fittings for measuring the pressure of the inert gas. For example, the use of T-fittings also requires the removal and replacement of the T-fitting after a weld is completed and in preparation for the next weld. This can be not only time consuming, but allows for the introduction of impurities into the pipeline as the fitting is reused, or lays around a job site until it is reused. The purity of the pipeline and the weld and welding process are of major importance in many plants, in particular in semi-conductor plants where very small amounts of trace elements can cause unacceptable variations in quality control. Thus, each time a T-fitting is reused, an additional possibility of contamination arises.

Additionally, since the T-fitting is installed in the pipeline, it may be installed at the joint to be welded prior to the welding or generally installed downstream of the weld site at the location of the next weld since it is not possible to monitor the pressure at the weld site during the welding, itself. However, the distance will usually vary between welds, such that the distance between the weld site and the T-fitting will not be constant from one weld to the next. As a result, more fluctuations in the purge gas pressure will occur, requiring still further compensation in the gas pressure. Also, the remote location may not have the same pressure as the weld site. In any event this measured pressure is used as a "best" reference to maintain a proper pressure at the weld site during welding.

Also, there are times that the tubing and fittings are tacked together such as in spot welding of joints prior to the installing weld head or weld fixture block. In these cases there is no way to take a pressure reading at the weld site prior to welding. Also, all the joints are taped to seal them from contamination until ready to weld. Thus, there is no way that a T-fitting can then installed in the pipeline.

In the scenario in which the pipe and fittings have not been tacked, a measuring device capable of being placed around the pipe can be used inside an orbital weld head or weld fixture. The tungsten in the weld head, however, would interfere with the device if one would try to make the seal about the entire pipe.

A number of prior art pressure measuring devices have been developed in attempts to overcome these problems. However, these devices are subject to their own shortcomings. For example, existing devices create an annular chamber about the entirety of the joint to be welded.

SUMMARY OF THE INVENTION

It is therefore an object of the present invention to provide a pressure measuring device capable of taking pressure readings at the weld site before welding is performed.

It is another object of the present invention to provide a pressure measuring device that is simple to manipulate and use.

It is yet another object of the present invention to provide a pressure measuring device capable of providing a pressure measurement for a specific point along the perimeter of a joint to be welded.

The present invention is a device for measuring the pressure of a gas flowing in axially aligned abutting pipe members to be welded together at a joint. The device generally includes a collar having a groove formed in an inner surface thereof and a pressure sensing device in fluid communication with the groove, such as via a nipple and hose arrangement. The groove is formed to surround and seal only a portion of the perimeter of the joint to be welded, while the collar is formed to surround and seal an additional portion of the perimeter of the joint to be welded. The remaining portion of the perimeter of the joint to be welded may be sealed by tape or via seal means included in the pressure measuring device. It may also be sealed by extending the collar around the entire perimeter of the joint to be welded. Thus, the groove and the outer wall of the pipe members form a sealed cavity, the pressure inside of which provides an indication of the pressure of the flowing gas inside the pipe. In embodiments, the pressure measuring device includes a handle.

BRIEF DESCRIPTION OF THE DRAWINGS

FIG. 1a is an illustration of the pressure measuring device according to a first embodiment of the present invention;

FIG. 1b illustrates the pressure measuring device of FIG. 1a attached to a pipe;

FIG. 2a is an illustration of the pressure measuring device according to a second embodiment of the present invention;

FIG. 2b illustrates the pressure measuring device of FIG. 2a attached to a pipe;

FIGS. 7a and 7b show an alternative embodiment of the present invention;

FIG. 8 shows the alternative embodiment device about an entire perimeter of a joint;

FIG. 9 shows the alternative embodiment device about a partial perimeter of the joint;

FIG. 15 is a perspective view of the alternative embodiment shown in FIG. 13; and FIG. 16 is an exploded view of FIG. 13.

DETAILED DESCRIPTION OF A PREFERRED EMBODIMENT OF THE INVENTION

Figure 3:
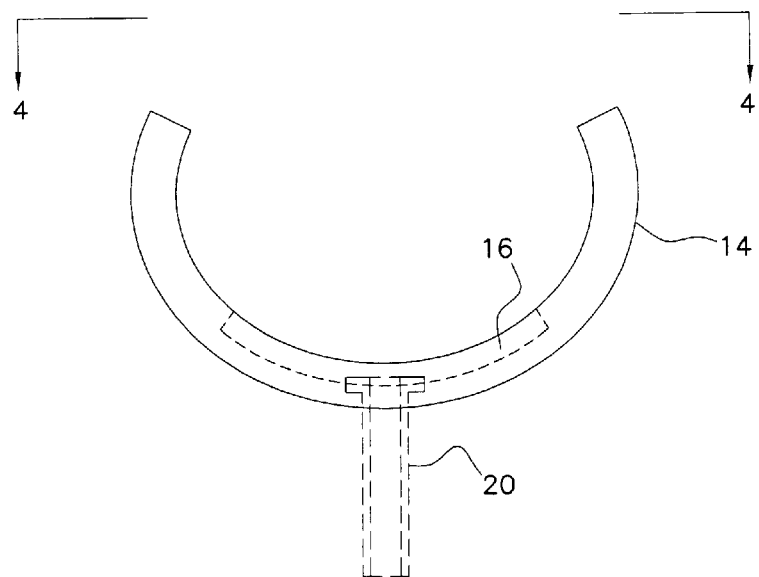
FIG. 3 is a front view of the collar.

Referring now to the drawings, and, more particularly, to FIGS. 1a and 1b, there is shown a device 10 for sampling the pressure of a gas flowing in axially aligned abutting pipe members 12 to be welded together at a joint. Pressure measuring device 10 generally includes a collar 14 having a groove 16 formed in an inner surface thereof and a pressure sensing device 18 (e.g., a Magnehelic pressure gauge) in fluid communication with groove 16. Collar 14 is preferably elastomeric to facilitate a tight seal on pipe members 12, but may be made of other materials (e.g., PVC pipe). In the embodiments of the invention, fluid communication is achieved between groove 16 and pressure sensing device 18 by providing a nipple 20 extending through collar 14 in fluid communication with groove 16 and connected to pressure sensing device 18 via a hose 22. In embodiments, nipple 20 extends partially into groove 16. However, other methods of achieving fluid communication are contemplated, for example, attaching pressure sensing device 18 directly to nipple 20. Pressure measuring device 10 may also include a handle 24 attached to collar 14. For example, a caliper-style handle as shown in FIGS. 1a and 1b may be provided to assist the user in properly placing and sealing collar 14 and groove 16 about pipe members 12.

As best seen in FIG. 1b, groove 16 is formed to surround and seal a portion of the perimeter of the joint to be welded, while collar 14 is formed to surround and seal an additional portion of the perimeter of the joint to be welded. That is, collar 14 surrounds a greater portion of the perimeter of the joint than does groove 16.

It will be apparent to one skilled in the art that, in order to ensure an accurate pressure reading on sensing device 18, the remaining portion of the perimeter of the weld must be sealed to prevent leakage of the flowing gas other than into pressure measuring device 10. Accordingly, in embodiments, pressure measuring device 10 further includes a mechanism for surrounding and sealing the remaining portion of the perimeter of the joint to be welded. This may be accomplished, for example, by providing a piece of elastomeric tape 26 or other appropriate sealant over the remaining portion of the joint and sealing with collar 14 over tape ends as shown in FIG. 1b. Alternatively, the remaining portion of the joint may be sealed by adapting collar 14 to surround the remaining portion of the perimeter of the joint as shown in FIG. 2b, but with groove 16 still not surrounding the entire perimeter of the joint. Other methods of sealing the remaining portion of the joint, such as by welding, are contemplated as within the scope of the invention.

When attached as shown in FIGS. 1b and 2b, groove 16 and the outer surface of pipe members 12 define a sealed cavity 28. Pressure sensing device 18, which is in fluid communication with groove 16 via nipple 20 and hose 22 in embodiments, measures the pressure within cavity 28. Since the flowing gas cannot escape from pipe members 12 other than into cavity 28, the pressure within cavity 28 is substantially equal to and an indication of the pressure of the gas flowing in pipe members 12. As seen in FIG. 2b, a gripping or handle portion 25 may extend from collar 14.

Figure 4:
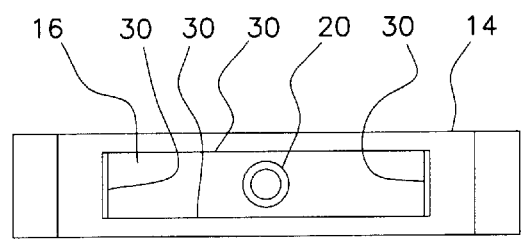
FIG. 4 is a view of the collar taken along line 4—4 in FIG. 3.
Figure 5:
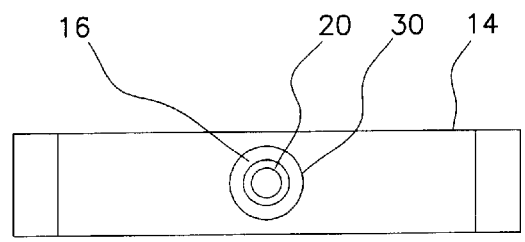
FIG. 5 is a view of an alternative embodiment of the groove.

Referring now to FIGS. 3–5, it can be more clearly seen that collar 14 is formed to surround a greater portion of the perimeter of the joint than is groove 16. Groove 16 may be defined as a polygon by a plurality of opposing wall sections 30 (FIG. 4), or as a substantially circular groove by a single wall section 30 (FIG. 5). That is, the ends of groove 16 are completely closed within collar 14.

Figure 6:
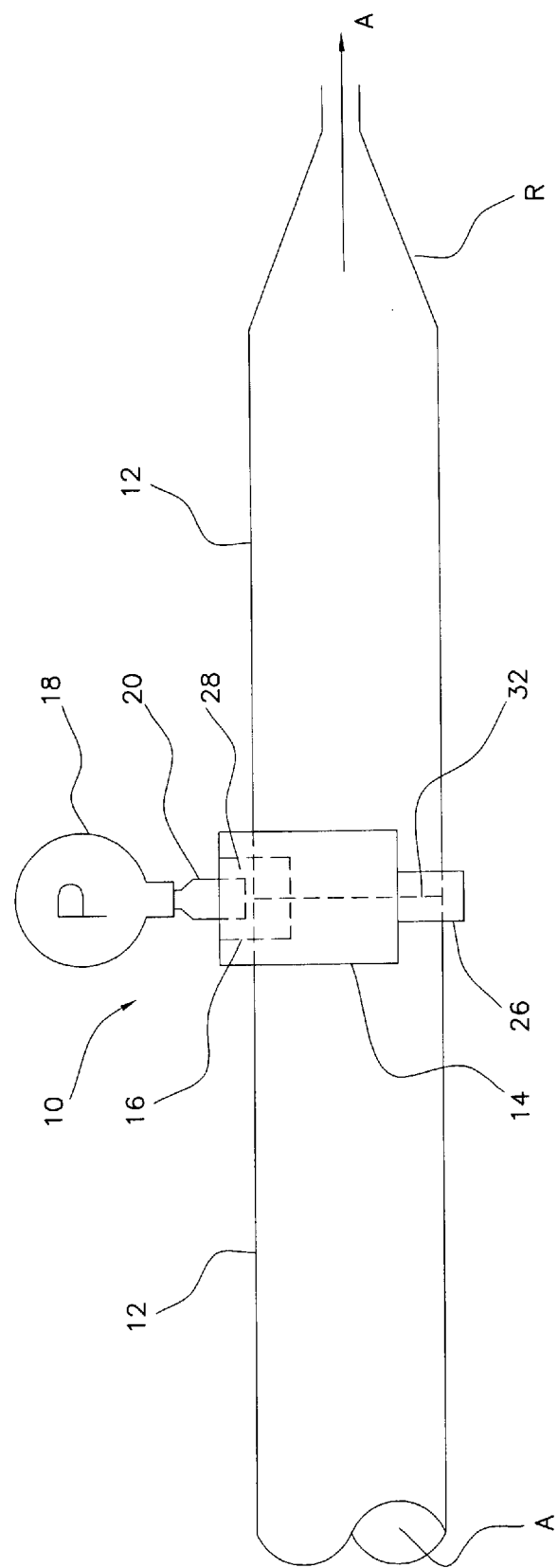
FIG. 6 illustrates the use of the present invention.

Use of pressure measuring device 10 is shown in FIG. 6. First, pipe members 12 are brought together in axial alignment and butted together at joint 32. Collar 14 may then be placed over joint 32, sealing a portion of the perimeter of joint 32 and forming sealed cavity 28 over a lesser portion of the perimeter of joint 32. The remaining portion of the perimeter of joint 32 not sealed by collar 14 must also be sealed, such as by covering with elastomeric tape 26. A gas is then caused to flow through pipe members 12 (such as indicated by arrows A) by any known method. A portion of the gas will escape into sealed cavity 28. Pressure sensing device 18 is in fluid communication with sealed cavity 28, and will therefore measure the pressure within sealed cavity 28. Since escape of the gas to the atmosphere is prevented by the seal created by collar 14 and tape 26, the welded portion, or other sealant, the pressure within sealed cavity 28 is a good indicator of the pressure of the gas flowing through pipe members 12. A restrictor ("R") or reduction in size at the outlet end of the tube is provided in order to create a back pressure for proper weld profiles. (FIG. 6).

Since groove 16 surrounds and seals only a portion of the perimeter of the joint, it is possible with pressure measuring device 10 to take continuous pressure readings while welding another joint. Furthermore, pressure measuring device 10 allows for more accurate and targeted pressure readings, as sealed cavity 28 does not extend around the entire perimeter of the joint. Pressure measuring device 10 is also simpler to manipulate than existing devices, as it can be placed at any position on the joint and easily moved from joint to joint along the pipe during the welding process.

FIGS. 7a and 7b show an alternative embodiment of the present invention. Specifically, FIG. 7a shows a side plan view of the device 10 for sampling the pressure of a gas flowing in axially aligned abutting pipe members. In this embodiment, the device includes collar 14 having groove 16 and nipple 20 in fluid communication with groove 16. On the underside of collar 14 is an adhesive backing 14a which adheres collar 14 to the joint. In this manner, a seal may be achieved. FIG. 7b shows an underside of the embodiment of FIG. 7a. The adhesive 14a may be partially or wholly on the underside of the collar, depending on the particular application or use of the device 10.

Figure 10:
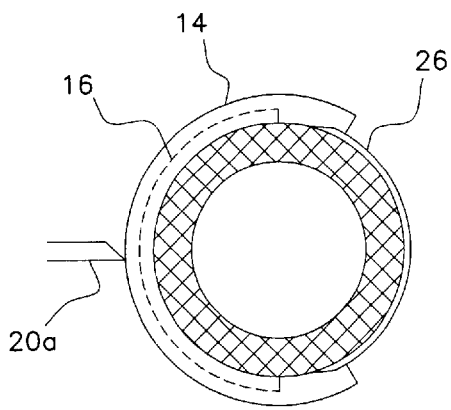
FIG. 10 shows an exploded view of FIG. 9.

FIG. 8 shows the alternative embodiment device 10 about an entire perimeter of a joint. FIG. 9 shows the alternative embodiment device 10 about a partial perimeter of the joint. FIG. 10 shows an exploded view of FIG. 9. In this view, the alternative embodiment device 10 is about a partial perimeter of the joint and tape 26 is about the remaining portion of the joint. It is further noted that the alternative embodiment device 10 may eliminate the use of the nipple 20 (which may also be eliminated from the other embodiments discussed herein). In these embodiments, a probe is pushed through the material into the groove 16. The material will then seal the probe. The probe 20a can then be connected directly to the pressure sensing device 18 or by the tube 22 or hose connected to the pressure sensing device 18.

Figure 11:
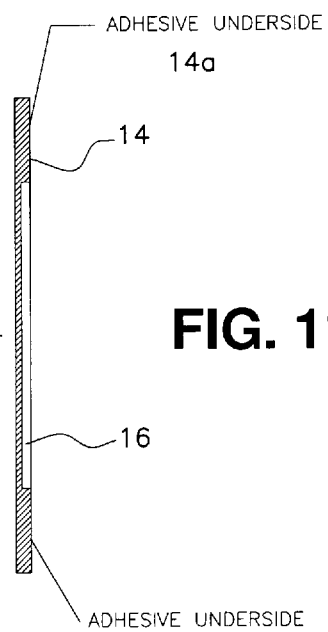
FIG. 11 shows another alternative embodiment of the present invention.

FIG. 11 shows another alternative embodiment of the present invention. In this embodiment, the device 10 includes the probe 20a which communicates with groove 16. In this manner (as discussed with reference to FIG. 10), the use of the nipple 20 is eliminated.

Figure 12A:
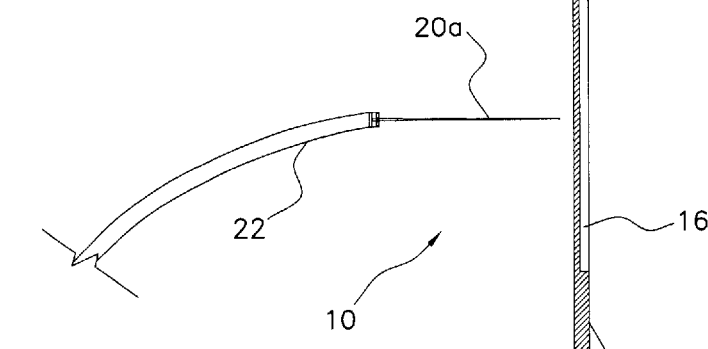
FIGS. 12A and 12B show the alternative embodiment of FIG. 11.
Figure 12B:
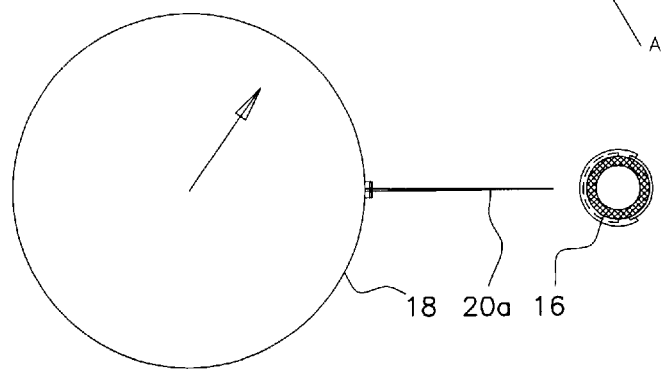

FIGS. 12A and 12B show the alternative embodiment of FIG. 11. In this representation, the probe 20a preferably penetrates groove 16 such that probe 20a provides fluid communication between pressure gauge 18 and groove 16. In FIG. 12a, the probe is connected directly to the pressure sensing device 18. In FIG. 12b, the probe is connected to the pressure sensing device 18 via the tube 22. With these configurations, the pressure gauge 18 is now capable of measuring the pressure within the axially aligned pipes at the joint.

Figure 14:
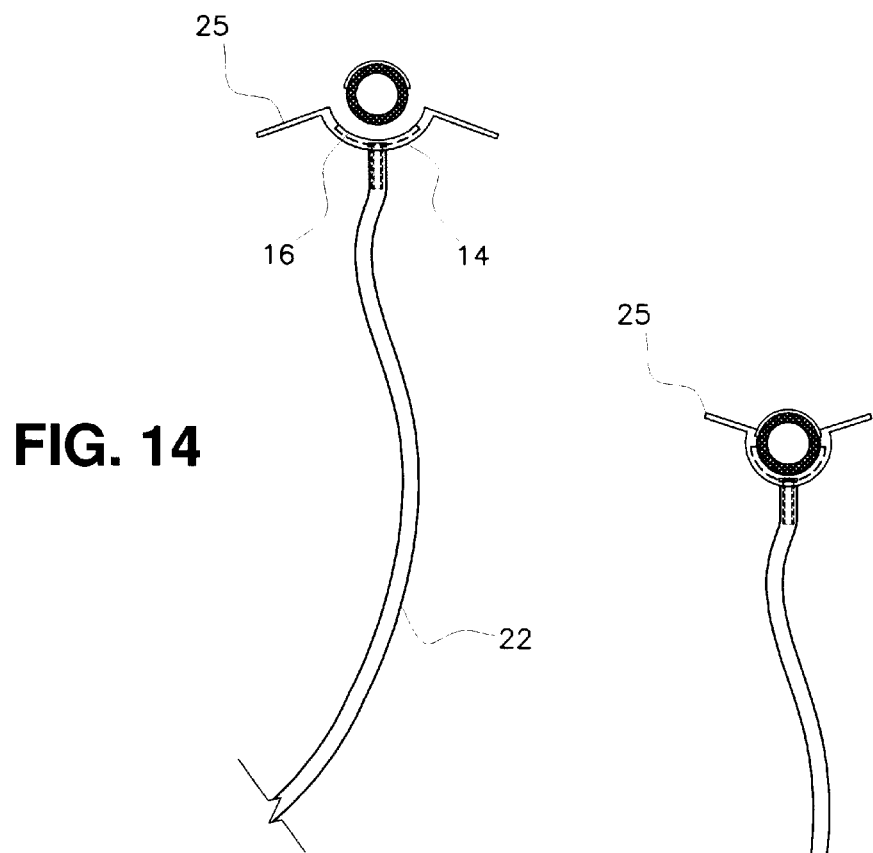
FIGS. 13 and 14 show the alternative embodiment about a pipe joint, similar to that shown and described with reference to FIGS. 2a and 2b.
Figure 13:
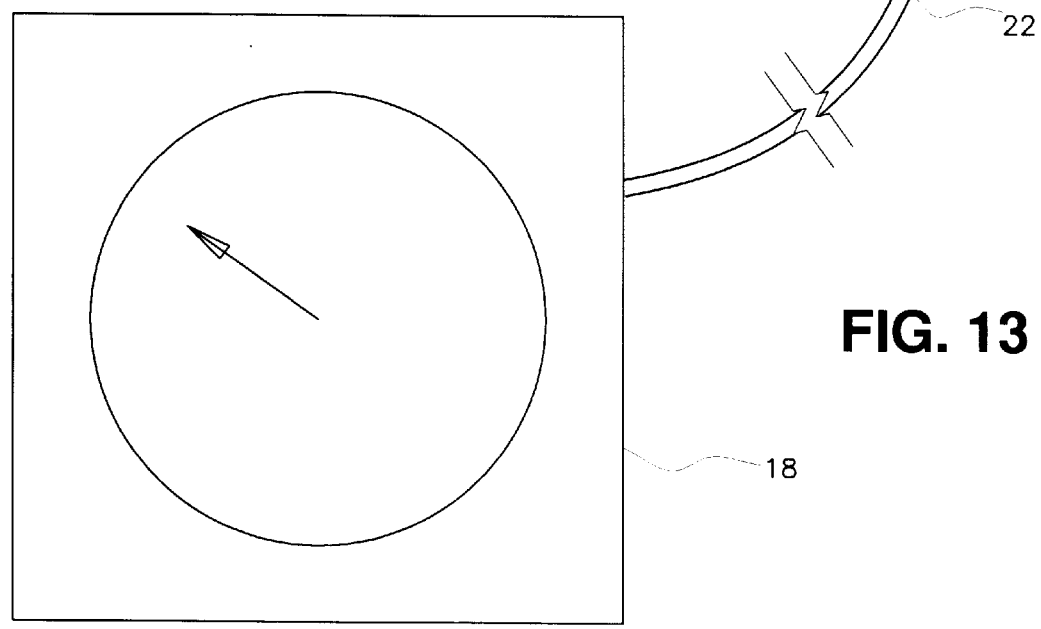

FIGS. 13 and 14 show the alternative embodiment about a pipe joint, similar to that shown and described with reference to FIGS. 2a and 2b. FIG. 15 is a perspective view of the alternative embodiment shown in FIG. 13, and FIG. 16 is an exploded view of FIG. 13. In both of these views, it is shown that the device 10 includes grips or handles 25.

While the invention has been described in terms of its preferred embodiments, those skilled in the art will recognize that the invention can be practiced with modifications within the spirit and scope of the appended claims. Thus, it is intended that all matter contained in the foregoing description or shown in the accompanying drawings shall be interpreted as illustrative rather than limiting, and the invention should be defined only in accordance with the following claims and their equivalents.

What is claimed is:

1. A device for sampling the pressure of a gas flowing in axially aligned abutting pipe members to be welded together, said device comprising:

a collar having a groove formed in an inner surface thereof, the groove formed to surround and seal a portion of a perimeter of a joint and said collar formed to surround and seal an additional portion of the perimeter of the joint, said groove and an outer surface of said pipe members defining a sealed cavity; and a pressure sensing device in fluid communication with said groove for measuring a pressure within said sealed cavity as an indication of the pressure of the gas flowing in the pipes.

2. The device according to claim 1, wherein said additional portion of the perimeter of the joint is a remaining portion of the perimeter of the joint.

3. The device according to claim 1, wherein said groove is defined by a plurality of opposing wall sections within said collar.

4. The device according to claim 1, wherein said groove is defined by a singular wall section within said collar.

5. The device according to claim 1, wherein said collar is elastomeric.

6. The device according to claim 1, further comprising a handle attached to said collar.

7. The device according to claim 6, wherein said handle is a caliper.

8. The device according to claim 1, further comprising means for surrounding and sealing a remaining portion of the perimeter of the joint.

9. The device according to claim 8, wherein said means is said collar.

10. The device according to claim 8, wherein said means is an elastomeric tape.

11. The device according to claim 1, further comprising a nipple extending through said collar and in fluid communication with said groove.

12. The device according to claim 11, wherein said nipple extends into said groove.

13. The device according to claim 11 further comprising a hose connecting said nipple to said pressure sensing device.

14. The device according to claim 1, wherein said collar includes an underside surface having an adhesive formed thereon.

15. The device according to claim 14, wherein said adhesive is partially formed on the underside surface of said collar.

16. The device according to claim 14, wherein said adhesive is formed on the underside surface of said collar except at said groove.

17. The device according to claim 1, further comprising:

a probe in fluid communication with said groove; and a hose extending from said probe.

18. The device according to claim 1, further comprising a probe extending into said groove and extending to said pressure sensing device.

19. The device according to claim 1, further comprising a grip extending from said collar.

20. A method for determining the pressure of a gas flowing in pipe members to be welded together at a joint, comprising the steps of:

placing said pipes in axially aligned end-to-end abutment at the joint to be welded;

forming a sealed cavity over only a portion of a perimeter of the joint to be welded;

sealing a remaining portion of the perimeter of the joint to be welded; and measuring a pressure within said cavity as an indication of the pressure of the gas flowing in the pipe members.

* * * * *